United States Patent [19]

Hammer et al.

[11] 4,253,879
[45] Mar. 3, 1981

[54] SHAPED ARTICLE COMPRISING A PERMANENTLY PLASTICIZED CELLULOSE HYDRATE COMPOSITION AND PREPARATION THEREOF

[75] Inventors: Klaus-Dieter Hammer, Mainz; Günter Gerigk, Oberursel; Wolf-Rainer Neeff, Wiesbaden; Max Bytzek, Naurod, all of Fed. Rep. of Germany

[73] Assignee: Hoechst Aktiengesellschaft, Frankfurt am Main, Fed. Rep. of Germany

[21] Appl. No.: 856,034

[22] Filed: Nov. 30, 1977

[30] Foreign Application Priority Data

Dec. 1, 1976 [DE] Fed. Rep. of Germany ....... 2654427

[51] Int. Cl.$^3$ .................................................. C08L 1/24
[52] U.S. Cl. ................................... 106/165; 106/166; 106/180
[58] Field of Search ........................ 106/180, 165, 166

[56] References Cited

U.S. PATENT DOCUMENTS

| 2,273,636 | 2/1942 | Gellendien | 264/343 |
|---|---|---|---|
| 2,381,511 | 8/1945 | Muskat et al. | 106/180 |
| 2,519,227 | 8/1950 | Collins | 106/165 |
| 2,584,998 | 2/1952 | Filachione | 106/180 |
| 3,116,353 | 12/1963 | Brower | 106/165 |
| 3,607,328 | 9/1971 | Rose et al. | 106/166 |
| 3,674,523 | 7/1972 | Rose et al. | 106/166 |
| 3,861,931 | 1/1975 | Taylor | 106/165 |
| 3,884,270 | 5/1975 | Rasmussen | 106/168 |
| 4,002,712 | 1/1977 | Hammer et al. | 264/194 |

FOREIGN PATENT DOCUMENTS

| 1414073 | 9/1965 | France . |
| 2027823 | 2/1970 | France . |
| 1201830 | 8/1970 | United Kingdom . |
| 1259666 | 1/1972 | United Kingdom . |
| 1417419 | 12/1975 | United Kingdom . |
| 1493367 | 11/1977 | United Kingdom . |

OTHER PUBLICATIONS

Carl R. Noller, "*Chemistry of Organic Compounds*", W. B. Saunders Co., 1965, p. 209.

*Primary Examiner*—Theodore Morris
*Attorney, Agent, or Firm*—Schwartz, Jeffery, Schwaab, Mack, Blumenthal & Koch

[57] ABSTRACT

A shaped article, especially a tubing, is disclosed which comprises a plasticized cellulose hydrate composition comprising a cellulose hydrate and a plasticity enhancing amount of at least one substantially water insoluble plasticizing ester of an aliphatic monocarboxylic acid containing from about 9 to about 24 carbon atoms and a polyalcohol comprising at least two hydroxy groups at least one of which is esterified with said aliphatic monocarboxylic acid, and water and/or a plasticizer.

Such shaped articles can be prepared by mixing a viscose solution with a liquid containing the plasticizing ester, introducing the resulting mixture into a precipitating bath and drying the precipitated shaped body. Tube-shaped articles are especially suited as sausage casings.

27 Claims, 3 Drawing Figures

SHAPED ARTICLE COMPRISING A PERMANENTLY PLASTICIZED CELLULOSE HYDRATE COMPOSITION AND PREPARATION THEREOF

BACKGROUND OF THE INVENTION

The present invention relates to permanently plasticized shaped articles, preferably packaging material, such as films, in particular, tubings, comprising a permanently plasticized cellulose hydrate composition which comprises a mixture of cellulose hydrate and a permanently plasticizing ester. The mixture may further contain water, and if desired, a secondary chemical plasticizer. The present invention, in particular, relates to a tubular casing comprising said permanently plasticized cellulose hydrate composition for use as a packaging material, in particular, for use as an artificial sausage casing.

Furthermore, the present invention comprises processes for the manufacture of a shaped article, in particular, a tubing, comprising said permanently plasticized cellulose hydrate composition.

Shaped articles of cellulose hydrate, in particular, packaging material, can be readily disposed of after use, by burning them, and they have the further advantage in that they undergo bacterial decomposition relatively rapidly. It is well known that in the course of time, cellulose hydrate materials, such as films and casings, change their properties, in particular, their shrinking properties. This latter property is particularly important in the case of sausage casings, since it is necessary that the sausage casing always adapts itself to the likewise shrinking sausage material in such a manner that the sausage casing is always well filled with the sausage composition. Tubular casings of synthetic polymers, such as polyamide, polyester, polyvinylidene chloride or the like, do not show this advantageous behavior to the required degree, due to their inert properties. For this reason, sausages with casings of the above polymers frequently become wrinkled and unattractive in an undesired manner and thus unsellable.

The properties and the structure of the cellulose hydrate forming the shaped articles can be varied within wide limits by varying the properties and composition of the starting viscose solution, the average degree of polymerization, the spinning conditions, stretching conditions, and drying conditions, during the manufacture of the shaped articles and the plasticizer content thereof.

It has also been proposed to improve the suppleness of plasticizer-free cellulose hydrate by adding fat-like chemical substances which are capable of crosslinking.

In the case of synthetic water vapor impermeable sausage casings which are made of a cellulose hydrate material which has been plasticized with a secondary chemical plasticizer and which are coated on their inside with a water vapor impermeable polymer film, extensive shrinkage of the casing occurs after removal or loss of the secondary plasticizer. Such removal of the secondary plasticizer from the casing material is unavoidable during the manufacture of sausages. This shrinkage causes a high internal pressure coupled with a simultaneous embrittlement of the cellulose hydrate. Thus, there is a risk that these casings, in most cases, will tear over the entire length of the casing when the sausage is cut.

If the tearing of the casings is prevented by previously moistening or cooling the sausage, a considerable part of the sausage material will be pressed out from the cut surface in an undesirable manner as a result of the high internal pressure.

During the course of the manufacturing process, the initial shaped bodies, which are in the gel state, may be subjected to the action of a secondary chemical plasticizer. The nature and amount of the plasticizer provides a further possibility of structurally influencing the structure and properties of the resulting cellulose hydrate material.

It is undesirable that during the storage of the shaped articles, the structure of the cellulose hydrate changes as a function of time, thereby causing a deterioration in the mechanical properties of the shaped articles.

The cellulose hydrate is densified by crystallization due to the formation of hydrogen bridge bonds, thus shrinks correspondingly and displaces a part of the secondary plasticizer from the fabric. Although the tensile strength of the shaped article then rises, its extensibility and its swelling value decrease.

Even more serious and disadvantageous are the changes in structure and properties, which take place on quantitative removal of the secondary plasticizer from the shaped article, which takes place if the latter is subjected to the action of water during its intended use. In this event, the cellulose hydrate shrinks very strongly, is densified and is embrittled. Admittedly, this process has the advantage that, when tubing of this type is used as artificial sausage casings, the material filled in it is always tightly enclosed by the latter, but it also has the disadvantage that the shrinkage is more extensive than necessary, so that the internal pressure in the sausage becomes excessive, the embrittled sausage casing then frequently tears when the sausages are cut open, and the sausage casings burst during manufacture or transportation of the sausages.

This undesirable effect occurs in particular, if the sausage casings additionally have a water impermeable coating on their inside.

Although it is known, in order to avoid this disadvantage, to add plasticizing chemical crosslinking agents into the solution or dispersion of the viscose used for the manufacture of the tubing, so that the defects mentioned can be largely eliminated, the known process has the disadvantage that the chemical compounds used are of a complicated structure and their quantitative synthesis is difficult to achieve, that is the resulting products are usually not uniform. Thus, the spinning fluid may, in an uncontrolled manner, contain undesirable side and fission products of the fatty chemical crosslinking agent, which have an unfavorable effect on the quantitative balance between the chemical crosslinking agent and the viscose contained in the spinning fluid and also on the quantitative balance between the viscose and the liquid solvent or dispersing agent used for the chemical crosslinking agent within the spinning fluid.

The use of short-chain crosslinking agents or of high-molecular polyglycols disclosed in the U.S. Pat. No. 3,843,378, either does not have the desired effect or these additives are quantitatively removed from the tubing by re-dissolution during the manufacturing process.

Hitherto it has not been possible to satisfactorily adjust the properties of shaped articles of cellulose hydrate, in particular, tubing, in a desirable manner.

In particular, when a tubing which is based on cellulose hydrate and is coated on the inside, is used as an artificial sausage casing, the extensive shrinkage and the associated densification and embrittlement of the material are significant defects.

SUMMARY OF THE INVENTION

It is an object of the present invention to provide permanently plasticized cellulose hydrate materials, in particular, films, which are useful as packaging material, e.g., for food, especially tubings which are useful as sausage casings and wherein the disadvantages of the prior art cellulose hydrate materials are avoided.

It is a further object of the present invention to provide such permanently plasticized cellulose hydrate material, especially for use as a sausage casing, which retains a satisfactory suppleness for its intended use, even after any secondary plasticizer has been completely removed therefrom, e.g., during a sausage manufacturing process.

It is a further object of the present invention to provide a permanently plasticized cellulose hydrate material which is preferably suited for preparing sausage casings which comprise an inside coating of a moisture impermeable polymer and optionally a fibrous reinforcement, in particular, a permanently plasticized cellulose hydrate material which improves the properties and behavior of such sausage casings with respect to the shirring procedure to which sausage casings are usually submitted, and which especially reduces the necessary storage time prior to the shirring operation and improves the stability of the sausage casing during and after the shirring procedure.

It is a further object of the present invention to provide a permanently plasticized cellulose hydrate material, in particular a packaging material, which has an appropriate shrinkability to readily adjust to the shrinkage of its content. It is a special object of the invention to provide such a material which yields sausage casings wherein the after-shrinkage of the casing after the manufacture of the sausage is considerably reduced, preferably to such a degree that an always well filled sausage, yet the content of which is under no excessive internal pressure, is achieved and bursting of the sausage or tearing of the casing upon cutting essentially is prevented.

It is another object of the present invention to provide a permanently plasticized cellulose hydrate material which is sufficiently supple and exhibits an appropriate degree of shrinkage to provide a sausage casing which permits the preparation of sausages which can easily be transported and stored and which can readily be cut without tearing of their casing even if the humidity of the ambient atmosphere is low.

It is still a further object of the present invention to provide such a permanently plasticized cellulose hydrate containing packaging material, e.g., a sausage casing, wherein the desirable properties of cellulose hydrate are retained, but which at the same time exhibit the desirable properties of packaging materials, which are made from synthetic polymers.

It is still a further object of the present invention to provide a process for preparing shaped articles of permanently plasticized cellulose hydrate, by which the disadvantages of the prior art processes are avoided.

In order to accomplish the foregoing objects according to the present invention, there are provided shaped articles, especially films and tubes, which are adapted for packaging food, which include plasticized cellulose hydrate composition which comprises a cellulose hydrate and a plasticity enhancing amount of at least one substantially water insoluble ester of an aliphatic monocarboxylic acid containing from about 9 to about 24 carbon atoms and a polyalcohol comprising at least two hydroxy groups at least one of which is esterified with said aliphatic monocarboxylic acid.

The above described shaped articles further comprise water, and, optionally, a secondary chemical plasticizer.

According to the present invention, there is further provided a process for preparing the above described shaped articles which comprises the steps of:

(a) mixing a viscose containing solution and a liquid comprising at least one substantially water insoluble ester of an aliphatic monocarboxylic acid containing from about 9 to about 24 carbon atoms and a polyalcohol comprising at least two hydroxy groups at least one of which is esterified with said aliphatic monocarboxylic acid to form a liquid mixture, (b) introducing the liquid mixture through the shaping orifice of a die into a precipitating liquid to precipitate a shaped body comprising the cellulose hydrate in the gel state and a plasticity enhancing amount of said ester, and (c) heat treating the shaped body to obtain a dried shaped article comprising the plasticized cellulose hydrate composition.

The process may further comprise the step of treating the shaped body in the gel state with a solution of a plasticizer.

The water content of the shaped article may be further adjusted to provide a desired degree of suppleness thereto, e.g., by moistening with water.

The tube-shaped articles according to the present invention are particularly useful as sausage casings. Accordingly, there is further provided according to the present invention a process for preparing sausages which comprise the step of filling the sausage material into an above described tube-shaped article.

Further objects, features and advantages of the present invention will become apparent from the detailed description of the invention and its preferred embodiments which follow when considered together with the accompanying Figures of Drawing, wherein:

DETAILED DESCRIPTION OF THE INVENTION

Figure 1:
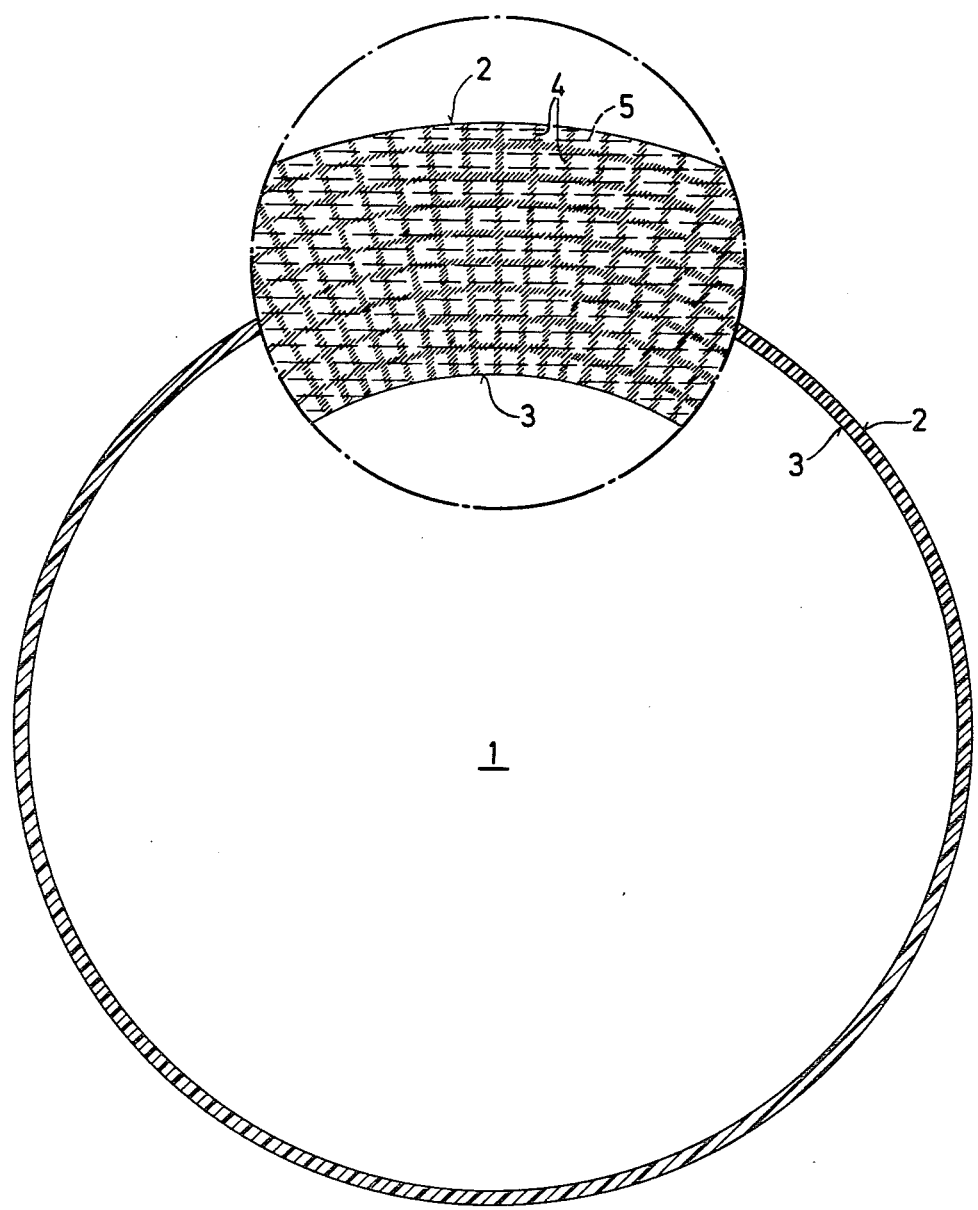
FIG. 1 is a schemative view of a cross-section of a tube-shaped article according to the present invention.

The permanent plasticization of the shaped articles according to the present invention is particularly important for their use in the form of tubing as an artificial sausage casing. Such a tubing, according to the present invention, remains sufficiently supple for its intended use as a sausage casing, even after all of the secondary plasticizer has been quantitatively removed from the tubing during the manufacture of sausages.

A secondary plasticizer may be included into the shaped article, especially a sausage casing, for the purpose of reducing structural changes therein during the storage period prior to its use in the sausage manufacture, and for providing that the end point of any such structural change is reached more rapidly.

A tubing according to the present invention, which further comprises a reinforcement of a fibrous material, preferably a fiber paper and an inside coating of a water vapor impermeable polymer, preferably a vinylidene chloride copolymer, has further important advantages when used as an artificial sausage casing. The necessary storage time before tubular casings of this type can be shirred to give so-called casing sticks, which are used in the manufacture of sausages, can be reduced to only a few days. The more supple cellulose hydrate composition lowers the mechanical stress during the shirring procedure and lessens the effect of impressing the outer shirring folds into the material, and thus, prevents damage (fracture) to the coating film on the inside of the tubing on prolonged storage of the casing stick.

In a case where a tubing according to the present invention is used as a sausage casing to which an inside coating of polymer is applied, it is a particularly important advantage that the after-shrinkage of the sausage casing after preparation of the sausage is considerably reduced, yet a sufficient degree of after-shrinkage is retained.

Preferably, the plasticized cellulose hydrate composition of the shaped articles, according to the present invention, essentially consists of cellulose hydrate, at least one permanently plasticizing ester of an aliphatic, preferably saturated, monocarboxylic acid containing from about 9 to about 24, preferably about 15 to 18, and most preferably 17, carbon atoms, and an aliphatic alcohol having at least two alcoholic hydroxy groups, at least one of which is esterified with said acid, or mixtures of esters of this type, water, and, if appropriate, a secondary chemical plasticizer.

According to a preferred embodiment of the present invention, the plasticizing esters are esters of at least one aliphatic monocarboxylic acid containing at least about 14, preferably from about 14 to about 20, most preferably about 17, carbon atoms, and preferably an aliphatic alcohol which contains at least two, preferably primary OH-groups. Among these alcohols, the following are particularly preferred: lower alkyl polyols containing 2 to about 6 carbon atoms and 2 to about 6 hydroxy groups, such as:

(1) lower alkyl diols, e.g., ethanediol, propanediol, butanediol, and lower alkyl tri- or tetraols, e.g., glycerol and pentaerythritol;

(2) lower alkyl penta- and hexaols, such as sorbitol, mannitol, dulcitol, glucose and sucrose;

(3) polyethers of the above lower alkyl polyols, for example, polyglycols, such as polyethylene glycols of the general formula

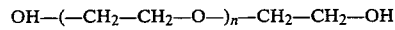

in which n is an integer in the range of from 1 to about 50, preferably an integer of from about 10 to about 25, in particular, diglycol, triglycol, polyethylene glycol-200 and polyethylene glycol-1000, and also polypropylene glycols of the general formula

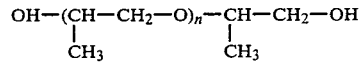

in which n is an integer of from 1 to about 50, preferably an integer of from about 10 to about 25.

Polyglycols which are suitable as the alcohol component of the esters, preferably have a molecular weight of between about 200 and about 4,000.

(4) branched or unbranched aliphatic higher-molecular alcohols which contain more than two OH-groups and which are formed by ethoxylation and/or propoxylation of lower polyols, preferably tri- or tetraols, such as glycerol, diglycerol, trimethylolmethane or pentaerythritol. Advantageously, all of the hydroxy groups of the polyols are substituted by an ethylene oxide- or propylene oxide chain, and which may comprise up to about 50, in particular, from 3 to about 20, ethylene oxide units and/or propylene oxide units.

Among the aliphatic monocarboxylic acids, saturated acids are preferred. Yet, mono-unsaturated and poly-unsaturated fatty acids, for example, oleic acid, linoleic acid or linolenic acid, are also suitable as an acid component in the ester.

The esters may comprise only one type of acid component per molecule, or may comprise two or more different acid components per molecule. Thus, the unsaturated fatty acids can preferably be present as an additional acid component in the ester molecule, in addition to one of the above-mentioned saturated fatty acids.

In addition to the OH-groups which are esterified with the above-defined monocarboxylic acids, further hydroxy groups of the alcohol component within suitable permanently plasticizing esters may be esterified with a, preferably, aliphatic carboxylic acid, which contains at least one further functional group which is a hydroxy group or a carboxyl group, for example, a di- or tri- carboxylic acid or a hydrocarboxylic acid containing 1 to 3 carboxyl groups. Aliphatic hydroxycarboxylic acids are preferred.

In particular, such aliphatic carboxylic acids containing from 2 to about 8 carbon atoms in their molecule chain are suitable; aliphatic hydroxycarboxylic acids, in particular, lactic acid or citric acid, are most preferred.

An example of a suitable aromatic hydroxycarboxylic acid is salicyclic acid.

It is essential for the permanently plasticizing effect of the plasticizing esters in the shaped article that these esters are insoluble, or substantially insoluble in water. They are thus not extractable with water from the shaped article.

In the manufacture of the shaped articles, ready dispersibility of the permanently plasticizing esters is important whenever they are to be used in the form of aqueous dispersions.

The permanently plasticizing action of the esters is due to the chemical structure of the ester molecule, as well as to their molecular size. Hereby, the hydrocarbon chain of the fatty acid component of the esters is mainly responsible for the plasticizing action and the molecular structure of the ester is responsible for the bonding of the ester within the cellulose hydrate structure of the shaped article.

The above defined esters which represent an essential constituent of the shaped articles are capable of permanently plasticizing cellulose hydrate and therefore the abbreviated term "permanently plasticizing esters" is used in the following text to designate these esters.

The shaped articles according to the present invention comprise as their essential ingredients, cellulose hydrate, a permanently plasticizing ester, water, and, if desired, a secondary chemical plasticizer. Yet, it is understood that it may contain other chemical substances in such amounts that they do not adversely affect the favorable properties of the shaped article.

Within the scope of the present invention, the term "shaped article" comprises fibers, threads and in particular, packaging material, such as, for example, films, and especially tubings.

According to another preferred embodiment of the present invention, there is provided a tubing in the wall of which a reinforcement of a fibrous material, in particular, a non-woven fleece, preferably a long-fibered paper fleece, is incorporated. A fiber-reinforced tubing, in particular, a tubing reinforced with paper fiber, is here to be understood as a tubing which is formed when a paper fiber tubing is impregnated and coated with the permanently plasticized cellulose hydrate composition according to the present invention.

"Cellulose hydrate" is to be understood as a known product which is formed when a conventional aqueous alkaline viscose solution is brought into contact with an aqueous precipitating liquid, for example, with an aqueous sulfuric acid/sodium sulfate bath, which effects the coagulation of the dissolved constituents of the viscose solution, whereby the latter are chemically regenerated into cellulose hydrate. Depending on the shape which has been imparted to it, the coagulate is capable after drying to form self-supporting shaped articles, such as fibers, films or tubings. Methods for manufacturing such shaped articles made of coagulated cellulose hydrate in the form of fibers, films or of a tubing containing a reinforced fiber insert therein, are known in the art. For their manufacture, conventional devices are used. In the case of the manufacture of tubings, these devices have an annular slit die through which the viscose solution which is to be coagulated is spun into a conventional precipitating liquid, whereby it is converted into a tubular form.

The shaped article contains between about 0.5 and about 40% by weight, preferably between about 5 and about 15% by weight, of the permanently plasticizing ester, relative to the total weight of the cellulose hydrate.

Preferred shaped articles comprise in addition to the cellulose hydrate, the permanently plasticizing ester, water and a secondary chemical plasticizer.

The water content of preferred shaped articles is of from about 5 to about 25% by weight, preferably between about 8 and about 12% by weight, relative to the total weight of the article.

Preferred shaped articles contain an amount of from about 1 to about 35% by weight, advantageously of from about 18 to about 25% by weight, of the secondary plasticizer relative to the total weight of the shaped article.

Shaped articles which contain a secondary plasticizer may have a relatively low water content, for example, a water content of about 4% by weight, relative to their total weight, without the desired application properties of the shaped articles being affected.

The above defined permanently plasticizing esters, which are embedded between the cellulose hydrate molecules of the shaped article, are substantially not extractable from the shaped article when the latter is treated with water, since they are essentially water insoluble due to their chemical structure; this property is the reason and precondition for the permanently plasticizing action of the ester in the shaped article.

Within the scope of the description of the present invention, the term "secondary chemical plasticizer" is to be understood as those water soluble chemical compounds which, due to their molecular structure, are capable of having a plasticizing effect on shaped cellulose hydrate articles into which they are introduced. Due to their solubility in water, they are extractable from the shaped article when the latter is treated with water.

The secondary chemical plasticizers are therefore not suitable for permanently plasticizing the shaped article. Examples of suitable secondary chemical plasticizers are water soluble lower alkyl polyols, such as glycerol or glycol, and ethoxylated derivatives thereof, such as polyethylene glycols. The use of these chemical substances as plasticizers is well known in the art.

Due to their ready dispersibility in water, permanently plasticizing esters which, as an additional acid component, contain hydrophilic, aliphatic hydroxycarboxylic acids, for example, lactic acid or citric acid, are advantageous in the manufacture of the shaped articles.

The following are examples of the quantitative and qualitative composition of particularly advantageous shaped articles comprising the plasticized cellulose hydrate composition, water and optionally a secondary plasticizer:

| I. | 1. | Cellulose hydrate, |
|---|---|---|
| | 2. (a) | glycerol monostearate, |
| | (b) | glycerol distearate, |
| | (c) | polyethylene glycol-1000 monostearate, |
| | (d) | polyethylene glycol-1000 distearate, |
| | (e) | glycerol monostearate in which the second OH-group is esterified with citric acid or lactic acid, |
| | (f) | polyethylene glycol-1000 monostearate in which the second OH-group is esterified with citric acid or lactic acid, in quantities of about 10% by weight, in each case, |
| | (g) | blends of the esters mentioned under (a) to (f) in quantities of about 10% by weight in total, |
| | 3. | water (about 10% by weight), and |
| | 4. | a secondary chemical plasticizer in the form of glycerol, glycol or polygylcol (about 22% by weight), |

| II. | 1. | Cellulose hydrate, |
|---|---|---|
| | 2. (a) | a mixture of 1 part of glycerol monostearate and 1 part of polyethylene glycol-1000 monostearate (about 10% by weight in total), |
| | (b) | a mixture of 1 part of glycerol distearate and 1 part of polyethylene glycol-1000 distearate (about 10% by weight in total), |
| | (c) | a mixture of 1 part of glycerol monostearate and polyethylene glycol-1000 distearate (about 10% by weight in total), |
| | (d) | a mixture of 1 part of glycerol distearate and 1 part of polyethylene glycol-1000 monostearate (about 10% by weight in total), |
| | 3. | water (about 10% by weight), and |
| | 4. | glycerol as a secondary chemical plasticizer (about 20% by weight). |

The foregoing by-weight percentages are relative to the total weight of the shaped article.

Particularly preferred are shaped articles which are comprised of chemical compounds which are physiologically harmless.

By way of example, the structural arrangement of the various chemical components in the shaped article is explained in a simplified and diagrammatic representation in the Drawings, wherein the Figures show possible variants of the shaped article.

FIG. 1 shows a diagrammatical cross-section of the structure of a tubing (1), (2), and (3) comprising permanently plasticized cellulose hydrate composition (4) and water (5).

Figure 2:
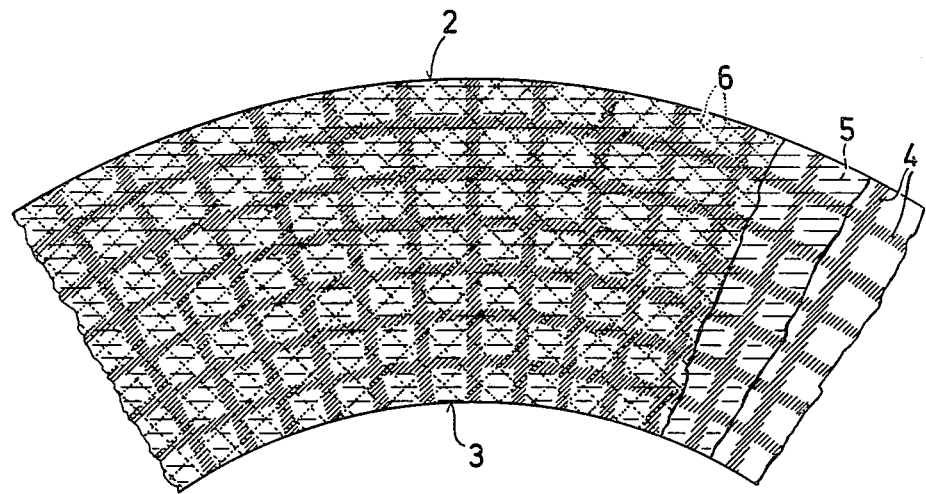
FIG. 2 is a schematic view of a partial cross-section of a tube-shaped article according to the present invention; and, FIG. 3 is a schematic view of a partial cross-section of a tube-shaped article according to the present invention.
Figure 3:
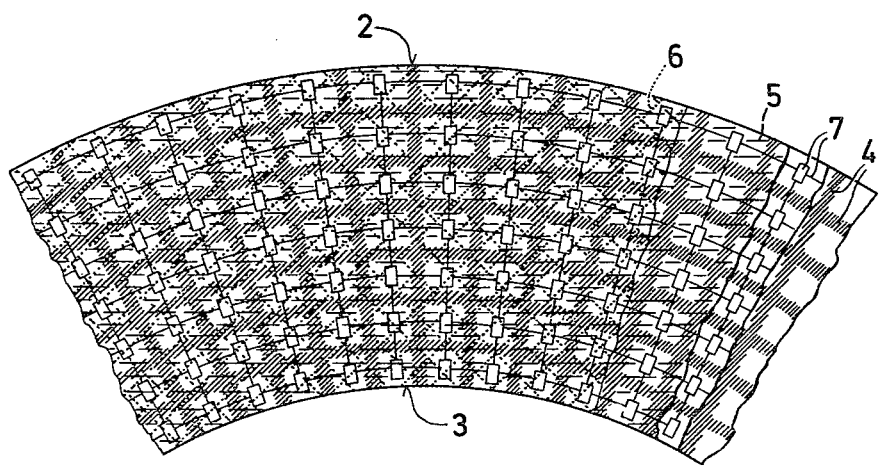

FIG. 2 is a diagrammatic representation of a cross-section showing the structure of a tubing comprising the following components: permanently plasticized cellulose hydrate composition (4), water (5) and a secondary chemical plasticizer (6). In order to better indicate the separate graphic symbols of the components, these components are shown in staggered sequence in the right-hand region of FIG. 2.

In FIG. 1, (1) denotes the cavity of the tubing, (2) denotes the outer side of the tubing, (3) denotes the inner side of the tubing facing the cavity of the tubing, (4) denotes permanently plasticized cellulose hydrate composition and (5) denotes water.

In FIG. 2, the numbers (1), (2), (3), (4) and (5) have the same meaning as in FIG. 1. (6) denotes a secondary chemical plasticizer.

It is known that shaped articles, in particular films and tubing, of conventional cellulose hydrate are increasingly embrittled and hardened during storage.

As is known, this phenomenon is to be ascribed to a crystallization process which gradually proceeds in the shaped cellulose hydrate article and whereby a formation of hydrogen bridge bonds between the individual molecular chains and hence a closer approach and a spatial fixation of the latter occurs in the cellulose hydrate structure.

The said process of crystallization and structural change entails a progressive deterioration of certain physical properties, in particular of the elongation, the strength and the swelling value of the shaped articles; it likewise causes the shrinkage of the shaped article.

Various processes have been proposed in order to counteract the process of structural change, which gradually proceeds in shaped cellulose hydrate articles and the disadvantageous embrittlement of the shaped articles associated therewith.

According to prior art processes, a plasticizer may be introduced into the cellulose hydrate by passing an initially shaped body of cellulose hydrate during the course of the manufacturing process through a liquid bath which contains a chemical plasticizer, such as, for example, glycerol, glycol or polyglycol, or the like. Although the softness and grip of the shaped articles are substantially improved by incorporating the plasticizer therein, its mechanical strength is simultaneously reduced in an undesirable manner, particularly when relatively large amounts of plasticizer are incorporated.

Furthermore, the plasticized shaped cellulose hydrate articles, which have been manufactured by the known prior art processes, embrittle during a prolonged storage time since the above mentioned plasticizers tend to migrate out of the shaped article. This is due to the fact that in the shaped articles which are manufactured by the prior art processes, the above mentioned plasticizers are not linked to the cellulose hydrate molecules by a chemical bond, but only by inter-molecular forces. The said chemical plasticizers are designated as "secondary plasticizers" within the present specification.

It is also known to react shaped cellulose hydrate articles, which contain secondary chemical plasticizers with chemical compounds which, due to their content in reactive groups, are capable of reacting with the hydroxyl groups of cellulose molecules, thereby crosslinking these cellulose molecules.

Although shaped cellulose hydrate articles which exhibit a high mechanical strength are obtained by these prior art processes, the disadvantage in this case is the low extensibility of the resulting shaped articles which is caused by the crosslinking. The tendency to crystallize is not sufficiently suppressed and the embrittlement of the shaped articles is not eliminated to an adequate extent.

According to the known process, depending on the amount of the crosslinking agents used, a greater or lesser portion of the hydroxyl groups of the cellulose molecule which is available for a conversion is chemically bonded by the action of the chemical agents crosslinking the cellulose hydrate chains. However, in the course of time, a formation of hydrogen bridge bonds still occurs between the hydroxyl groups of the cellulose hydrate molecules which have not been bonded and these hydrogen bridge bonds lead to an embrittlement of the shaped articles. However, the use of crosslinking chemical agents in quantities which are so large that all of the hydroxyl groups of the cellulose hydrate molecules are blocked, is ruled out, since, under these conditions, hard and brittle shaped articles are formed which are useless.

It has also been proposed (Belgian Pat. No. 823,410) to manufacture shaped articles of plasticized cellulose hydrate by mixing a viscose solution with a solution which contains stearyltrimethylolurea or stearylethyleneurea or alkylamine-bis-dimethylene-triazinone-tetramethylol or alkylamide-bis-dimethylene-triazinone-tetramethylol, then spinning the fluid mixture through a forming die into a precipitant fluid, washing the formed structure and subsequently drying it by the action of heat.

Although the shaped articles which are manufactured by this prior art process have the advantage of being internally plasticized, they nevertheless have the disadvantage that the intermediate products are difficult to prepare and contain substances which contaminate the spinning bath and thus can adversely affect the spinning process.

The present invention also relates to a process for preparing the plasticized shaped articles comprising the above defined plasticized cellulose hydrate compositions. By means of the process according to the present invention, it is possible in a simple manner to manufacture permanently plasticized shaped articles, based on cellulose hydrate, which do not embrittle even on prolonged storage and which even after a prolonged period in storage or in use, retain a sufficient elongation and tensile strength, as well as swelling values, which make them suitable for the intended use, in particular, for their use as an artificial sausage casing in the case of shaped articles in the form of a tubing.

According to the present invention, the shaped articles, in particular, tubings, are prepared in a process wherein a viscose solution is forced through a shaping die into a precipitating liquid. The resulting initial shaped body which is in the gel state is then passed through regenerating and wash baths, and optionally an acidic aqueous solution of a secondary chemical plasticizer is then allowed to act thereon. Then, this shaped body is dried by heating it and, if appropriate, is moistened with water after drying. According to the process of the present invention, the viscose solution is mixed with a fluid which contains the permanently plasticizing esters. Preferably used are esters of an aliphatic monocarboxylic acid containing from about 10 to about 24 carbon atoms, and an alcohol containing at least two alcoholic groups in the molecule, at least one of which is esterified with said acid, or mixtures of different, permanently plasticizing esters of the said type. The resulting fluid mixture is forced through the shaping slit of a die body into an aqueous acid precipitating liquid, the resulting initially shaped body which is in the gel state is successively passed through several regenerating and wash baths, and, if appropriate, an acidic aqueous solution of a secondary chemical plasticizer is then allowed to act thereon. Subsequently, the shaped body is dried by heating and, if appropriate, the dried shaped article is thereafter moistened with water.

In place of the aforesaid preferred saturated, aliphatic monocarboxylic acids, mono-unsaturated and poly-unsaturated fatty acids, for example, oleic acid, linoleic acid or linolenic acid, are also suitable as the acid component in the ester.

The unsaturated fatty acids can also be present as an acid component in the ester molecule, in addition to the aforesaid saturated fatty acids.

In addition to the OH-groups which are esterified with the monocarboxylic acids defined above, suitable permanently plasticizing esters may also contain further ester groups, the acid component of which is an organic, preferably aliphatic, carboxylic acid, which contains at least one further functional group which is a hydroxy or a carboxyl group, preferentially an aliphatic hydroxycarboxylic acid.

In particular, such aliphatic carboxylic acids having from about 2 to about 8 carbon atoms in their molecule chain are suitable; aliphatic hydroxycarboxylic acids, in particular lactic acid or citric acid, are most preferred.

An example of a suitable aromatic hydroxycarboxylic acid is salicylic acid.

Individual permanently plasticizing esters which are suitable for carrying out the process have already been cited above within the description of the composition of the shaped articles. The tubing and films, which are prepared by the process according to the present invention, are suitable, for example, as packaging material. The filaments, threads and fibers which are produced by the process can be used for the manufacture of textile fabrics.

Within the present specification and claims, the definition "shaped article" is meant to denote the final product which is obtainable by the process according to the present invention (end product of the process).

The term "initially shaped body" is used to designate those shaped intermediate chemical products which are characterized by a spatial shape, yet which, due to their qualitative and quantitative chemical composition, in particular, with respect to the molecular structure of their components, and very particularly with respect to their water content, have no dimensional stability or only a comparatively low dimensional stability, in particular no mechanical strength or only a comparatively low mechanical strength as compared with the properties of the end product of the process. Within the present specification, the term "viscose solution" is intended to denote a solution of cellulose xanthogenate dissolved in an aqueous alkaline medium. Viscose solutions of this type are known in the art. Within the process of the present invention, it is advisable to use a viscose solution which comprises the cellulose xanthogenate dissolved in about a 7% sodium hydroxide solution and which has a gamma value of from about 25 to about 35, and contains from about 82 to about 83% by weight of water, from about 7 to about 8% by weight of cellulose, from about 5.5 to about 7% by weight of pure NaOH bonded to cellulose and also about 2.5% by weight of sulfur bonded to cellulose.

The permanently plasticizing esters which can be used for carrying out the process are those which have been described above within the description of the composition of the shaped article according to the present invention.

The fluid containing the permanently plasticizing esters is preferably an aqueous dispersion.

The total amount of dispersed, permanently plasticizing ester in the dispersion is between about 10 and about 35% by weight, preferably between about 15 and about 25% by weight, relative to the total weight of the dispersion.

Preferably, the fluid contains glycerol monostearate or a mixture of glycerol monostearate and polyethylene glycol-1000 monostearate in a ratio of 1:1 or glycerol monostearate in which one further OH-group is esterified with citric acid or lactic acid, or blends of the foregoing esters.

In addition to water, the liquid phase of the aqueous dispersion may also comprise a minor portion of a, preferably, water miscible organic solvent, for example, a lower alkyl alcohol such as ethanol, butanol, propanol or isopropanol.

It is also possible, however, that the fluid containing the esters is a solution or dispersion of the ester in a suitable, preferably water miscible, organic solvent, such as, for example, a lower alkyl alcohol or a polyglycol.

To prepare the fluid mixture containing viscose and a permanently plasticizing ester, a viscose solution is mixed, whilst stirring, with such an amount of the fluid containing the permanently plasticizing ester, that the resulting fluid mixture contains a dispersed amount of permanently plasticizing ester of from about 0.5 to about 40% by weight, preferably an amount of from about 1 to about 15% by weight, relative to the weight of the cellulose in the fluid mixture.

To prepare the aqueous dispersion containing a permanently plasticizing ester, known dispersing aids, such as, for example, alkyl-, aryl- or alkyl-aryl sulfonates or -sulfates, are advantageously used in amounts of between about 1 and about 5% by weight, preferably between about 3 and about 4% by weight, relative to the amount of dispersed material in the dispersion.

The dispersing aids assist in the uniform distribution of the permanently plasticizing ester in the fluid.

In the following example, the process will be further explained, using the preferred embodiment of manufacturing a tubing as an example. The manufacture of films, fibers or threads is carried out in essentially the same manner using appropriate dies known for this purpose.

The process is carried out in such a manner that a viscose solution is mixed with a fluid containing a permanently plasticizing ester whilst stirring, preferably in such a way that an appropriate amount of the fluid containing the ester is added, whilst stirring, to the viscose solution.

The resulting fluid mixture is then pressed through a shaping die, which for the manufacture of a tubing is an annular slit die, into a conventional aqueous acid precipitating liquid. Preferably a precipitating liquid is used which is known in the art under the name "Mueller bath" and consists of an aqueous solution of $H_2SO_4$ and $Na_2SO_4$. Preferably, the aqueous fluid contains about 10% by weight of sulfuric acid and about 14% by weight of sodium sulfate, relative to its total weight.

The initially shaped body, which is precipitated in the shape of tubing is then passed through several conventional regenerating and wash baths in a known manner. The regenerating baths each comprise aqueous solutions containing a certain amount of sulfuric acid and sodium sulfate dissolved therein, whereby the individual successive baths differ from each other by a different quantitative ratio of sulfuric acid to sodium sulfate therein.

Preferably, an aqueous acidic solution of a secondary plasticizer is then allowed to act on the tubing, for example by passing the tubing through a trough filled with this fluid. Glycerol, glycol or polyglycol are examples of suitable secondary chemical plasticizers. The plasticizer fluid preferably has a content of secondary chemical plasticizer in the range of between about 5 and about 20% by weight, preferably between about 10 and about 15% by weight, relative to the total weight of the solution. After this treatment, the tubing contains an amount of the above mentioned secondary chemical plasticizer of between about 18 and about 25% by weight, relative to the total weight thereof. During the treatment of the tubing with an aqueous solution of a secondary chemical plasticizer, the tubing is in the gel state, that is to say its water content is at least 270% by weight, relative to its own weight.

The period of time for the treatment of the tubing with the plasticizer solution is adjusted in such a way that it corresponds to allowing a hypothetical tubing section to remain in the plasticizer solution for a period of time of between about 120 minutes and about 30 seconds, in particular, a period of time of between about 30 minutes and about 1 minute, and preferentially a period of about 5 minutes.

After the action of the plasticizer solution on the tubing, the latter is heated to a temperature of between about 70° and about 140° C., preferably of between about 90° and about 120° C., for example, a temperature of about 110° C., whereby a high temperature is always associated with a short heating period and a low temperature is associated with a longer heating period.

The drying temperature is not critical as long as the selected temperature is not so high that the heat leads to undesired changes in the chemical substances forming the shaped article. The initially shaped body can also be dried at temperatures lower than 70° C., however, a correspondingly long drying time must then be accepted.

The drying of the tubing is effected, for example, by continuously passing the tubing at a constant speed through a drying tunnel of suitable length, for example, a drying tunnel of 50 m length, charged with hot air of an appropriate temperature.

Thereby, the residence time of the tubing in the drying tunnel depends on the speed of the forward movement of the tubing. This speed preferably is from about 5 to about 30 m/minute.

During the heat treatment, the tubing is in the inflated state which is produced by means of introducing a supporting amount of air into the interior of the tubing.

The supporting air is introduced into the tubing before the drying is started. Before moving into the drying tunnel, and likewise after leaving the drying tunnel, the tubing is passed through the gap of a pair of squeeze rollers.

As a result of the heating in the drying tunnel, the tubing is dried to such an extent that it has a desired water content, for example, a water content of about 10% by weight, relative to the total weight of the tubing.

After leaving the dryer, the tubing is advantageously brought into contact with water, for example, by spraying it with water, for further adjusting its water content. The period of time for treating the shaped article with water and the amount of water are adjusted in such a way that the tubing contains an amount of from about 7 to about 22% by weight, of water, preferably about 16% by weight of water, relative to its total weight, after the treatment with water.

The above process yields a tubing which contains an amount of secondary plasticizer of between about 18 and about 25% by weight, relative to the total weight of the tubing. The tubing is particularly suitable for use as an artificial sausage casing. It is very supple and can thus be readily handled during the intended further processing, for example, filling the tubing with a sausage composition.

The process according to the present invention can also be carried out in such a way that the fluid used for the preparation of the fluid mixture contains two or more than two permanently plasticizing esters which differ from each other by their different chemical structures with respect to the alcohols and acids from which they are formed.

In a very similar manner, a fiber-reinforced tubing comprising the plasticized cellulose hydrate composition, for use as a synthetic sausage casing, is manufactured, for example, by impregnating and coating a tubing of cellulose fibers with the fluid mixture described above in a conventional manner by means of conventional devices which are known in the art for this purpose, then introducing the resulting tubing in the manner described above into the aqueous precipitating bath, subsequently treating the tubing with the plasticizer fluid, then drying it and afterwards bringing it to a defined water content by moistening with water.

The definition of the gamma value which is used in the foregoing description and in the Examples below, among other data for characterizing a viscose solution, is described in "Kunststoff-Handbuch [Plastics Handbook]", volume 3, 1965, page 87 (Hanser-Verlag, Munich), the disclosure of which is hereby incorporated by reference.

The initial shaped body is in the gel state if the amount of water absorbed therein is between about 270 and about 320% by weight, relative to the weight of the body itself.

The process according to the present invention permits to prepare plasticized shaped cellulose hydrate articles, in particular tubing, in a simple manner, without altering the customary manufacturing conditions and without using additional process steps.

The shaped articles which are obtained by the process, in particular tubing, which is obtained by the process, are improved with respect to a large number of properties as compared with prior art shaped articles based on chemically modified cellulose, which are manufactured by known processes. These improvements are advantageous, especially in the case of a tubing which, after coating of its inside with water vapor impermeable layer, is used as an artificial sausage casing.

As a result of the specific chemical structure of the shaped articles, in particular, a tubing, according to the present invention, essentially no embrittlement of the tubing occurs during the manufacture of sausages, whereas such an embrittlement is otherwise unavoidable in a conventional tubing based on cellulose hydrate and is due to the loss of the chemical secondary plasticizer during the manufacture of sausages, as a result of the preliminary immersion of the sausage casings in water and the treatment of the sausage with hot water or superheated steam.

The elongation and tear propogation resistance of a tubing manufactured according to the present invention are so high that sausages, manufactured with the use of a tubing of this type as the sausage casing, can be cut without tearing.

EXAMPLE 1

14.6 g (corresponding to 5%, calculated on the amount of cellulose) of an aqueous emulsion containing 25% by weight of glycerol monostearate are mixed, whilst stirring vigorously into 1 kg of a viscose solution which has a cellulose content of 7.1% by weight, relative to the total weight of the solution, an alkali content of 5.78, a gamma value of 32.8, a NaCl ripening value of 3.25 and a viscosity of 123 seconds in a falling ball viscometer at 25° C. The percentage by-weight value refers to the proportion of dispersed material in the total weight of the dispersion.

The resulting fluid mixture is then pressed through an annular slit die having an outer diameter of 18 mm into a precipitating bath which consists of an aqueous solution containing 10% weight of $H_2SO_4$ and 14% by weight of $Na_2SO_4$, each relative to the total weight of the solution, whereby an initial tubular shaped body is formed.

Subsequently thereto, the tubing is passed successively through several conventional regenerating baths, the composition of which has been described above, and through a wash liquid, for example, water.

Subsequently thereto, the tubing which is in the gel state (swelling value: 320% by weight, relative to its total weight) is passed in the flattened form at a constant speed through a trough which contains an aqueous solution containing 11% by weight of glycerol which has been adjusted to a pH value of 2.5 by adding a corresponding amount of sulfuric acid.

The aqueous plasticizer solution is at a temperature of 70° C.

The period of time during which the aqueous solution, containing the glycerol as a secondary plasticizer, is acting on the tubing is adjusted so that after the treatment with this solution, the tubing contains a proportion of about 19% by weight of glycerol relative to the total weight of the tubing. For this purpose, the tubing is passed through the trough at a speed of 10 m per minute.

After the tubing has been treated with the plasticizer fluid, it is dried. For this purpose, the tubing is passed in the inflated state through a 50 m long drying tunnel at a speed of about 20 m per minute. The temperature in the drying tunnel is about 90° C. in the region of its inlet part and about 120° C. in the region of its outlet part.

After leaving the drier, the tubing has a water content of from about 8 to about 10% by weight, relative to its total weight.

The tubing is inflated by means of supporting air whilst it is guided through the drying tunnel by first passing the flattened tubing, before it enters the drying tunnel, through the gap of a first pair of squeeze rollers; after the inflated tubing has left the drying tunnel, it is passed through the gap of a second pair of squeeze rollers. At the start of carrying out the process, supporting air is introduced into the cavity of the portion of tubing between the two pairs of squeeze rollers, and this supporting air then maintains the above mentioned section of tubing between the two pairs of squeeze rollers constantly in the inflated state, while the further process is being carried out.

After the tubing has been dried, the latter is moistened with water, for example by spraying it with water. In this step, the duration or intensity of spraying is set in such a way that the tubing, after the treatment with water, has a water content of about 10% by weight, relative to the total weight of the tubing.

The manufactured tubing can be used as an artificial sausage casing.

EXAMPLE 2

A tube is prepared as described in Example 1, but using an aqueous emulsion of glycerol distearate of the same concentration in place of the aqueous emulsion containing 25% by weight glycerol monostearate.

EXAMPLE 3

A tube is prepared as is described in Example 1, but using an aqueous emulsion of polyethylene glycol-1000 monostearate of the same concentration in place of the aqueous emulsion containing 25% by weight of glycerol monostearate.

EXAMPLE 4

A tube is prepared as is described in Example 1, but using an aqueous emulsion of polyethylene glycol-1000 distearate of the same concentration in place of the aqueous emulsion containing 25% by weight of glycerol monostearate.

EXAMPLE 5

A tube is prepared as is described in Example 1, but with the difference that the viscose solution contains 28.9 g of an aqueous dispersion containing 25% by weight of a mixture of glycerol monostearate/polyethylene glycol-1000 monostearate in a ratio of 1:1 (10% by weight of total solids, relative to the amount of cellulose).

EXAMPLE 6

With the aid of a conventional coating die with an annular slit, a paper fiber tubing is continuously impregnated with a fluid mixture according to Example 5 and is provided on the inside and outside with a fluid layer consisting of this mixture. The paper fiber tubing is manufactured by folding a paper fiber web in such a way that the edges overlap and glueing the overlapping edges together. The coating of fiber tubing with a viscose-containing solution is described in British Patent Specification No. 1,259,666, the disclosure of which is hereby incorporated by reference.

The fiber tubing coated with the viscose solution is then further treated as indicated in Example 1. Before the fiber-impregnated tubing is passed through the drying tunnel, however, its inside is first provided with a layer of a chemical anchoring agent which consists of an epichlorohydrin-polyamine-polyamide resin which is described in British Pat. No. 1,417,419, the disclosure of which is hereby incorporated by reference. The chemical agent is applied in the form of an aqueous solution, for example, a 1% strength by weight aqueous solution, to the inside of the tubing, the volatile component of the layer is then evaporated by heating the tubing and the pre-anchoring layer is thus produced on the inside of the tubing. Subsequently thereto, an aqueous dispersion containing, for example, 8% by weight of a copolymer which is formed by copolymerization of a monomer mixture containing 88% by weight of vinylidene chloride, 3% by weight of acrylic acid, 7.5% by weight of acrylonitrile and 1.5% by weight of methylacrylate, relative to the total weight of the monomer mixture, and is applied to the pre-coated inside of the tubing. The tubing is then subjected to a temperature of 100° C., by passing the tubing through a correspondingly heated drying tunnel. The aqueous dispersing agent is thus expelled from the fluid layer on the inside of the tubing, so that a polymeric film coating is formed on the inside of the tubing; at the same time the tubing is dried by this heat. The dried tubing is then adjusted to a water content of 10% by weight, relative to its total weight by moistening it with water. The process for coating the inside of the tubing with an anchoring agent and with the above synthetic resin is described in the British Pat. No. 1,201,830, the disclosure of which is hereby incorporated by reference.

The process of preparing cellulose hydrate tubing, having on its inside an adhesion-promoting polymer coating, is described in the British Pat. No. 1,417,419. Therefore, details relating to this process are not described within the present specification.

The following characteristics are determined on the tubing:

TABLE

| Properties | | Comparative tubing | Tubing according to the invention | |
|---|---|---|---|---|
| | | | with a secondary | without plasticizer |
| breaking length, longitudinal | m | 3,625 | 3,325 | 3,350 |
| breaking length, transverse | m | 3,500 | 3,200 | 3,200 |
| elongation at break, longitudinal | % | 27 | 32 | 30 |
| elongation at break, transverse | % | 32 | 34 | 30 |
| bursting pressure | m water gauge | 11.0 | 11.2 | 11.5 |
| unit weight per m$^2$ | g | 102 | 108 | 98 |
| plasticizer | % | 19 | 21.3 | — |
| moisture | % | 10-12 | 10-12 | 10-12 |
| tear propagation resistance, longitudinal | kp/mm$^2$ | — | 1.71 | 1.52 |
| tear propagation resistance, transverse | kp/mm$^2$ | — | 1.60 | 1.26 |

Explanatory remarks for the Table

The data are determined on sections of tubing, which, before the test have been immersed in water at room temperature and, after removal from the water, are freed from superficially adhering liquid.

The comparative tubing consists of a cellulose hydrate tubing into which 25% by weight of a secondary chemical plasticizer (glycerol) were incorporated during its manufacture.

The tubing which is manufactured in accordance with Example 6 can readily be shirred and the stacking folds remain unchanged in storage for any desired length of time.

Sausages with a casing consisting of the tubing according to Example 6 can be cut open under normal climatic conditions, without the casing tearing or sausage material being forced out at the cut surface.

EXAMPLE 7

43.4 g of a dispersion containing 25% by weight of a mixture of glycerol monostearate/polyethylene glycol-1000 stearate in a ratio of 1:1 (total amount 15% by weight, relative to the amount of cellulose) are added to 1 kg of a viscose solution according to Example 5, and thoroughly mixed therewith. A tubing of 60 bore with a fiber paper insert is spun and coated, according to Example 6.

Compared with an untreated tubing, this tubing has the following properties:

| Properties | | Comparative tubing | Tubing according to the invention |
|---|---|---|---|
| breaking length, longitudinal | m | 4,050 | 3,050 |
| breaking length, transverse | m | 3,175 | 2,525 |
| elongation at break, longitudinal | % | 30 | 28 |
| elongation at break, transverse | % | 30 | 28 |
| bursting pressure | m water gauge | 10.5 | 10.7 |
| unit weight per m$^2$ | g | 96 | 108 |
| plasticizer | % | 18.6 | 17.7 |
| moisture | % | 8-10 | 8-10 |

The relatively high content of plasticizing ester has only slightly altered the properties of the tubing. The tubing is particularly supple and can be readily shirred.

Under normal conditions, sausages in these casings do not tear when cut open.

EXAMPLE 8

57.8 g of a dispersion containing 25% by weight of a mixture of glycerol monostearate/PEG-1000 stearate in a ratio of 1:1 (20%, relative to the cellulose) are added to 1 kg of viscose according to Example 5 and uniformly mixed therewith. This mixture is spun to give a tubing of 60 bore with a fiber paper insert. The tubing is coated according to Example 6.

Compared with an untreated tubing, this tubing has the following properties:

| Properties | | Comparative tubing | Tubing according to the invention |
|---|---|---|---|
| breaking length, longitudinal | m | 3,200 | 2,875 |
| breaking length, transverse | m | 3,025 | 1,775 |
| elongation at break, longitudinal | % | 40 | 36 |

-continued

| Properties | | Comparative tubing | Tubing according to the invention |
|---|---|---|---|
| elongation at break, transverse | % | 44 | 24 |
| bursting pressure | m water gauge | 11.0 | 7.2 |
| unit weight per m² | g | 104 | 105 |
| plasticizer | % | 23.7 | 18.1 |
| moisture | % | 8–10 | 8–10 |

Thus, the mechanical properties are already adversely affected to a marked extent by an amount of 20% (relative to the cellulose) of plasticizing ester. Nevertheless, the tubing is very supple and can be readily stacked; the folds remain perfect in storage for any desired length of time.

Sausages in these modified casings normally do not tear upon cutting.

EXAMPLE 9

A stable dispersion containing 20% of glycerol monostearate/monocitrate can be prepared by slowly stirring 40 g of the ester into a mixture of 150 g of water and 5 g of a 10% NaOH solution at 100° C., and cooling the mixture under stirring.

36 g of this dispersion (10%, relative to the cellulose) are admixed to 1 kg of a viscose solution having a cellulose content of 7.2%, an alkali content of 5.7, a gamma value of 33, a NaCl value of 2.0 and a viscosity of 140 seconds in a falling ball viscometer, and is uniformly mixed therewith.

As described in Example 6, the viscose is spun to give a tubing of 60 bore with a fiber paper insert, and the tubing is coated.

Compared with an untreated tubing, this tubing has the following properties:

| Properties | | Comparative tubing | Tubing according to the invention |
|---|---|---|---|
| breaking length, longitudinal | m | 3,800 | 3,650 |
| breaking length, transverse | m | 3,650 | 3,580 |
| elongation at break, longitudinal | % | 28 | 30 |
| elongation at break, transverse | % | 34 | 32 |
| bursting pressure | m water gauge | 10.5 | 10.8 |
| unit weight per m² | g | 101 | 102 |
| plasticizer | % | 22 | 23.5 |
| moisture | % | 10–12 | 10–12 |

The supple tubing can readily be shirred. The film remains perfect on the stacking folds after storage for any desired length of time.

Under normal climatic conditions, the casings do not tear when the sausages are cut open.

In Examples 7 to 9, the characteristic data determined on corresponding tubing samples were measured on a tubing which had been stored beforehand in water at room temperature and was then freed from adhering liquid. As indicated in Example 6, the comparative tubing consists in each case of a cellulose hydrate tubing into which about 25% by weight of a secondary chemical plasticizer in the form of glycerol were incorporated during its preparation.

While the invention has been described and illustrated with reference to certain preferred embodiments thereof, those skilled in the art will appreciate that various modifications, changes, omissions and substitutions may be made without departing from the spirit of the invention. It is intended, therefore, that the invention be limited solely by that of the following claims.

What is claimed is:

1. A shaped article comprising a permanently plasticized cellulose hydrate composition comprising a cellulose hydrate, a plasticity enhancing amount between about 0.5 and 40% by weight relative to said cellulose hydrate of at least one substantially water-insoluble ester of an acid consisting essentially of an aliphatic monocarboxylic acid containing from about 16 to about 18 carbon atoms and a polyalcohol comprising at least two hydroxy groups at least one of which is esterified with said aliphatic monocarboxylic acid and at least another of which is esterified with a carboxylic acid having from about 2 to about 8 carbon atoms containing a second functional group selected from the group consisting of hydroxy and carboxyl, and from about 5 to 25% by weight of water, wherein said composition is produced by a method comprising the steps of mixing a viscose containing solution with a liquid comprising said substantially water-insoluble ester to form a liquid mixture, and introducing the liquid mixture into a precipitating liquid to precipitate said shaped article comprising cellulose hydrate, whereby said ester permanently plasticizes said composition by being highly resistant to removal by water during subsequent handling and use of the shaped article.

2. A shaped article comprising a permanently plasticized cellulose hydrate composition comprising a cellulose hydrate, a plasticity enhancing amount between about 0.5 and 40% by weight relative to said cellulose hydrate of at least one substantially water-insoluble ester selected from the group consisting of glycerol monostearate, glycerol distearate, polyethylene glycol-1000 monostearate, polyethylene glycol-1000 distearate, and polyethylene glycol-200 monostearate, and from about 5 to 25% by weight of water, wherein said composition is produced by a method comprising the steps of mixing a viscose containing solution with a liquid comprising said substantially water-insoluble ester to form a liquid mixture, and introducing the liquid mixture into a precipitating liquid to precipitate said shaped article comprising cellulose hydrate, whereby said ester permanently plasticizes said composition by being highly resistant to removal by water during subsequent handling and use of the shaped article.

3. The shaped article as defined in claim 1 or 2, which further comprises a plasticizer.

4. The shaped article as defined in claim 1, wherein the aliphatic monocarboxylic acid is a saturated acid.

5. The shaped article as defined in claim 1, wherein the polyalcohol is an aliphatic alcohol.

6. The shaped article as defined in claim 5, wherein the polyalcohol is a lower alkyl polyol containing from about 2 to about 6 carbon atoms, and two to about six hydroxy groups.

7. The shaped article as defined in claim 5, wherein the polyalcohol is a polyether of a lower alkyl polyol.

8. The shaped article as defined in claim 7, wherein the polyalcohol is a polyalkylene glycol of the general formula

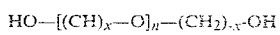

wherein n is an integer of from 1 to about 50, and x is 2 or 3.

9. The shaped article as defined in claim 2, wherein the ester is glycerol monostearate.

10. The shaped article as defined in claim 2, wherein the ester is glycerol distearate.

11. The shaped article as defined in claim 2, wherein the ester is polyethylene glycol-1000 monostearate.

12. The shaped article as defined in claim 2, wherein the ester is polyethylene glycol-1000 distearate.

13. The shaped article as defined in claim 2, wherein the ester is polyethylene glycol-200 monostearate.

14. The shaped article as defined in claim 2, wherein the plasticized cellulose hydrate composition comprises cellulose hydrate, and a mixture of glycerol monostearate and polyethylene glycol-1000 monostearate in a ratio of 1:1.

15. The shaped article as defined in claim 1, wherein the ester is an esterified glycerol in which one OH-group is esterified with stearic acid and a further OH-group is esterified with lactic acid or citric acid.

16. The shaped article as defined in claim 1, wherein the ester is an esterified polyethylene glycol-1000 in which one OH-group is esterified with stearic acid and a further OH-group is esterified with a hydroxycarboxylic acid selected from the group consisting of lactic acid and citric acid.

17. The shaped article as defined in claim 3, wherein the plasticizer is a water soluble polyalcohol.

18. The shaped article as defined in claim 17, wherein the plasticizer is a lower alkyl polyol.

19. The shaped article as defined in claim 17, wherein the plasticizer is a polyethylene glycol.

20. The shaped article as defined in claim 17, wherein the plasticizer is selected from the group consisting of glycerol, glycol and polyglycol.

21. The shaped article as defined in claim 1 or 2, which comprises cellulose hydrate, 10% by weight of the ester, relative to the weight of cellulose hydrate, 20% by weight of the plasticizer and 10% by weight of water, in each case relative to the total weight of the shaped article.

22. The shaped article as defined in claim 1 or 2, shaped as a film or a tube.

23. The shaped article as defined in claim 22, adapted for food packaging.

24. The shaped article as defined in claim 23, in the form of a sausage casing.

25. The shaped article as defined in claim 24, which further comprises a water impermeable polymer coating on its inner side.

26. The shaped article as defined in claim 24, which further comprises a reinforcement of a fibrous material therein.

27. The shaped article as defined in claim 1 or 2, wherein said method for producing said composition further comprises the step of heat treating said precipitated shaped article.

* * * * *